Sept. 14, 1926. 1,599,797
A. E. STACEY, JR
METHOD OF AND APPARATUS FOR UNIFORMLY DRYING OR PROCESSING MATERIALS
Filed August 12, 1924 2 Sheets-Sheet 2
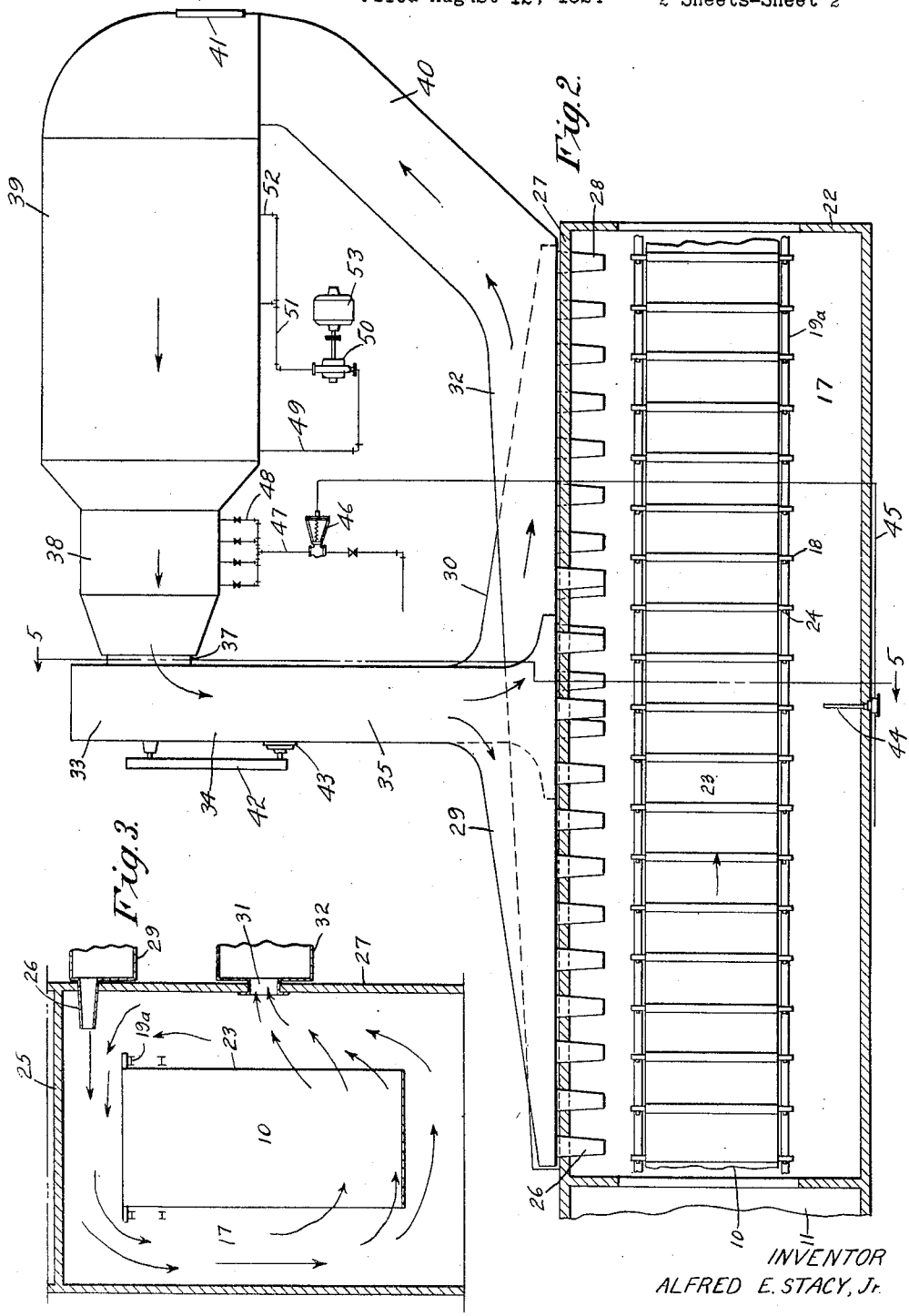

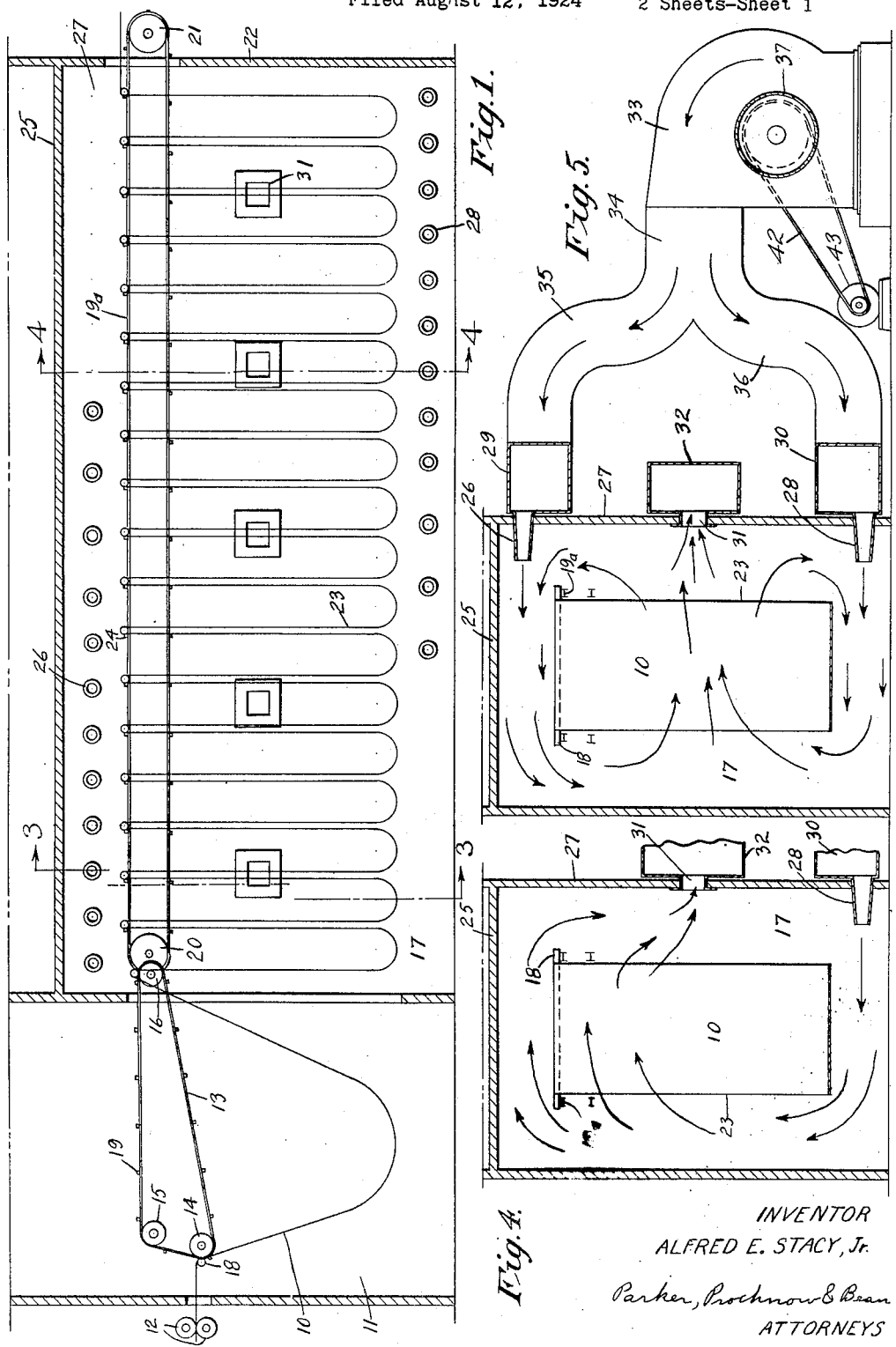

Patented Sept. 14, 1926.

1,599,797

UNITED STATES PATENT OFFICE.

ALFRED E. STACEY, JR., OF ESSEX FELLS, NEW JERSEY, ASSIGNOR TO CARRIER ENGINEERING CORPORATION, OF NEWARK, NEW JERSEY.

METHOD OF AND APPARATUS FOR UNIFORMLY DRYING OR PROCESSING MATERIALS.

Application filed August 12, 1924. Serial No. 731,552.

This invention relates to a method of uniformly subjecting materials to the action of air or other gases and has reference more particularly to a method of drying or treating materials in which different zones or portions of the material are subjected successively to the action of moving currents of air or gas so as to uniformly dry or treat the material at all points.

The invention further relates to an apparatus suitable for carrying out the above method.

In the drying of certain materials, such as films, coated fabrics, etc., it is customary to arrange the material in festoons on a moving conveyor and to pass the conveyor carrying the festoons through a chamber in which the material is subjected to the drying action of circulating air. It often happens in drying such materials, or other materials which do not offer sufficient resistance to the air to insure an equal distribution thereof throughout the material, that the materials leave the drying chamber in a supposedly dry condition, and upon examination are found to have wet spots in certain zones, due to the fact that all parts of the material have not been uniformly acted upon by the air. This objectionable feature is also noticed in other forms of drying, such as when materials are moved successively through a series of drying rooms and the air circulation is arranged in the same manner in each room.

An object of this invention, therefore, is to provide a method of drying or processing materials, particularly of the sort mentioned, which will insure that all parts of the material will be subject to substantially equal contact with and treatment by the air or gas to produce an uniform drying or conditioning of all parts of the material; also to provide a method of drying films, sheet material, etc., in which the air is first caused to successively impinge on different zones of the material to produce a uniform drying; and also to provide an improved apparatus which will carry out the above method and cause the material to be dried or treated uniformly on all areas.

Reference is to be had to the accompanying drawings, in which:

Fig. 1 is a longitudinal sectional view through a festoon drier embodying my invention, for drying sheet material.

Fig. 2 is a plan sectional view of the drying apparatus.

Fig. 3 is a sectional view through the apparatus on the line 3—3, of Fig. 1.

Fig. 4 is a sectional view through the apparatus on the line 4—4, Fig. 1.

Fig. 5 is a sectional view through the apparatus on the line 5—5, of Fig. 2.

The apparatus for carrying out the improved drying method may be varied in arrangement but may preferably take the form of a conveyor passing through an elongated drying chamber and carrying the material to be dried. Air is injected into the chamber at different levels along the path of travel of the conveyor so that the material is uniformly dried in zones, the air being preferably withdrawn from the chamber through a series of ports and passed through a dehumidifier and heater for re-injection into the chamber.

Referring to the accompanying drawing by numerals, 10 indicates a continuous strip of sheet material, such as film, coated fabric and the like, which is delivered into a festooning room 11 by feed rollers 12. Any suitable festooning mechanism may be employed, such as a conveyor 13 which passes around sprockets 14 and 15 in the room 11, and around sprockets 16 inside of a drying chamber 17. Transverse rods 18 are delivered under the strip 10 adjacent the sprockets 14, and lugs 19 on the conveyor 13 pick up the rods 18 in succession, so as to form festoons as said rods move along the conveyor 13. A conveyor 19ª passes through the upper part of the drying chamber 17 around sprocket wheels 20 adjacent the sprockets 16 and around sprocket wheels 21 outside the delivery end 22 of the drying chamber 17. The rods 18 are delivered by the festooning conveyor 13 onto the upper reach of the conveyor 19ª and are carried by the conveyor through the chamber 17 with the festoons 23 of the strip material 10, said rods being engaged by equally spaced lugs 24 on said conveyor.

The drying chamber 17 is suitably constructed so that air may be circulated in the chamber without excessive leakage therefrom. In the apparatus illustrated, a series of supply or injector nozzles 26 is arranged along the upper part of the wall 27 of the drying chamber 17 extending from the feed end of the chamber 17 to the middle portion thereof, and a series of supply or injector nozzles 28 is arranged along the bottom of the chamber 17 extending from the delivery end 22 of the chamber 17 to the middle portion thereof. It will be noted that the two series of nozzles overlap in the middle portion of the chamber so that at its middle portion the chamber has both upper and lower nozzles. A longitudinal duct 29 is connected, preferably outside the chamber wall 27, to each of the nozzles 26, and a duct 30 also preferably outside the chamber wall 27, is connected with each of the nozzles 28 so as to deliver air to said nozzles. A series of outlet ports 31 pass through the wall 27 between the two series of nozzles and are connected preferably outside of said wall to a longitudinal duct 32 so as to remove air from the chamber 17, preferably in amount substantially equal to the volume of air which has been delivered to the chamber through the nozzles 26 and 28.

As the material 23 passes through the drying chamber 17, a current of air first circulates from the upper nozzles 26, as shown in Fig. 3, above the material to the far side of the chamber 17, then downwardly and back or up through the material to the outlet ports 31. A comparatively small volume of air is discharged at a high velocity from the nozzles 26, but owing to the velocity of said air, the entire body of air in the front end portion of the chamber 17 is put into circulation, and the mixed incoming and chamber air is caused to pass through the material, thus accomplishing an efficient drying of the material, but with the principal drying effect and highest air velocity taking place at the lower zone of the material.

As the material passes further along in the drying chamber, it meets a condition as shown in Fig. 5, in which air is delivered by both the upper nozzles 26 and lower nozzles 28, said air serving to circulate the entire mass of air in the midlength portion of the chamber 17, but the principal current of the mixed incoming and chamber air passing through the middle zone of the material to the outlet ports 31.

A continued movement of the material carries it into air conditions illustrated in Fig. 4, in which only the lower nozzles 28 deliver air into the chamber 17 so as to cause the mass of air in said portion of the chamber to circulate in such a way as to cause the principal current of the mixed air to pass through the top zone of the material on its way to the outlet ports 31. The material 23 is thus uniformly dried, as it is first subjected to a bottom drying, as shown in Fig. 3, then a middle drying, and lastly a top drying as shown in Fig. 4, and no wet spots remain as the strip is removed from the drying chamber 17 through the wall 22.

The spacing and number of the nozzles 26, 28 and 31 is arranged to give the most uniform drying results, and said nozzles may be arranged, if desired, in other ways to similarly cause successive circulations through different zones of the material.

Apparatus of any suitable construction may be employed for circulating and conditioning the air and regulating its temperature and humidity as may be required, depending upon the desired drying or treatment of the material. As shown the apparatus for circulating the air consists preferably of a rotary fan or blower 33, which is provided with a discharge duct 34 which has an upper branch duct 35 connected to the duct 29, and a lower branch duct 36 connected to the duct 30. The suction side 37 of the fan 33 is connected to a heating chamber 38, and said heating chamber is connected to a dehumidifier 39. A duct 40 connects the dehumidifier 39 to the longitudinal return duct 32, and a fresh air inlet 41 is provided in the duct 40 adjacent the dehumidifier 39, said port 41 being provided with suitably controlled dampers, not shown, for regulating the amount of fresh air admitted to the system. The fan 33 is continuously rotated through the belt 42 by the motor 43. For controlling temperature of the air a thermostat 44, sensitive to temperature changes inside of the chamber 17, is connected to a compressed air line 45, which connects with the actuating motor or diaphragm of a valve 46 in a steam line 47. The steam line 47 has branches 48 which supply a heater in the heating chamber 38 so as to heat the air passing through said chamber 38. Thus the temperature of the air passing through the chamber 38 is automatically regulated at any predetermined point by means of the thermostatic element 44. A drain pipe 49 leads from the bottom of the dehumidifier 39 through a centrifugal pump 50 and through a pipe line 51 and branch lines 52, to sprays, not shown, inside the dehumidifier 39, adapted to cool and remove moisture from the air passing through said dehumidifier, thus drying the same. The pump 50 is continuously rotated by means of the motor 53.

It is not intended in this application to limit the invention in its broader aspects to the drying of strip material in festoons or any particular material or substance, nor to the particular construction of the apparatus illustrated, since the improved method and apparatus for successive different circulations of air or other fluid-treating medium can be used to advantage for drying or otherwise treating different materials, and the apparatus can be differently constructed and yet produce successive different circulations either in the same or successive rooms through which the material to be treated is moved continuously or intermittently.

I claim as my invention:—

1. The method of treating materials with air and other gaseous fluids which includes subjecting the material in succession to the action of currents of fluid and so directing the fluid currents which differ in velocity that the currents of the highest velocity are caused to impinge on different zones of the material at different times.

2. The method of treating materials with air and other gaseous fluids which includes moving the material through a chamber and subjecting the material in each of successive different portions of the chamber to the action of currents of fluid of different velocity so directed that the currents of the highest velocity are caused to impinge on different zones of the material when the material is in said different portions of the chamber.

3. The method of drying materials which includes moving the material through successive different portions of a drying chamber and subjecting the material in each of said successive portions of the chamber to the action of a current of gaseous fluid, the greatest volume of the fluid current being caused to impinge on different zones of the material when the material is in said different portions of the chamber.

4. In a drying apparatus, the combination with a room adapted for the reception of materials to be dried, of means for subjecting the material in the room to the drying action of currents of gaseous fluid having different velocities, said means being arranged to cause the fluid currents of greatest volume to impinge on different zones of the material at different times.

5. In a drying apparatus, the combination with an elongated chamber, and means for moving material to be dried through successive portions of said chamber, of means for subjecting material in each of said successive portions of the chamber to the drying action of currents of gaseous fluid of different velocities, said means being adapted to cause the fluid currents of highest velocity to impinge on different zones of the material in said different portions of said chamber.

6. In a drying apparatus, the combination with an elongated chamber, and means for conveying a material to be dried through said chamber, of means in one section of the chamber for injecting a current of air into said chamber at one level of the chamber so as to cause other air in said section of the chamber to mix and circulate with the injected air and to cause the current of highest velocity to impinge on one zone of the material, means for injecting a current of air into another section of said chamber at a different level of said chamber so as to cause other air in the second section of the chamber to mix and circulate with the injected air and to cause the current of highest velocity to impinge on a different zone of the material, and means for withdrawing portions of the air from the chamber.

7. In an apparatus of the nature described, the combination of an elongated chamber, means for conveying a strip of material in the form of festoons through successive portions of said chamber, and means for subjecting the material in each of said successive portions of the chamber to the action of currents of gaseous fluid of different velocities, said means being arranged to cause the currents of highest velocity to impinge on different zones of the material in said different portions of said chamber.

8. In a drying apparatus, a drying chamber adapted for the reception of materials to be dried, means for introducing high velocity currents of air into said chamber at different levels so as to dry different zones of the material at different times, means for removing portions of air from the chamber, and means for conditioning the air withdrawn from the chamber and reintroducing it into said chamber.

9. In a drying apparatus, an elongated chamber, means for conveying a material to be dried through said chamber, means for injecting currents of air at high velocity into said chamber at different levels so that other air in the chamber is caused to circulate and different zones of the material are dried at different portions along the chamber, means for withdrawing portions of air from the chamber, and means for conditioning the air withdrawn from the chamber and reinjecting the conditioned air into the chamber.

10. In an apparatus for treating materials with gaseous fluids, the combination with a chamber, and means for causing material to be treated to pass through successive portions of said chamber, of means for discharging fluid into each of said portions of the chamber in a direction and at a velocity such as to cause other gaseous fluid in said portion of the chamber to circulate and mix with said discharge fluid and the mixed fluid to circulate through the material, the fluid discharge means for said different portions of the chamber having different locations relatively to the chamber whereby the circulation of the mixed circulating fluid is different in said different portions of the chamber, and corresponding zones of the material are subjected to different current action in said different portions of the chamber.

11. In an apparatus for treating materials with gaseous fluids, the combination with a chamber, and means for causing material to be treated to pass through successive portions of said chamber, of fluid propelling means, and discharge nozzles through which the fluid is discharged by said propelling means at relatively high velocity into each of said different portions of the chamber, the discharge nozzles being differently located relatively to the chamber in said different portions of the chamber whereby the circulation of the fluid is different in said different portions of the chamber and corresponding zones of the material are subjected to different current action in said different portions of the chamber.

12. In an apparatus for treating materials with gaseous fluids, the combination with a chamber, and means for causing material to be treated to pass through successive portions of said chamber, of fluid propelling means, and discharge nozzles through which the fluid is discharged by said propelling means at relatively high velocity into each of said different portions of the chamber, the discharge nozzles being arranged to discharge the fluid so as to minimize the direct contact of the discharging fluid with the material, and the nozzles being differently located relatively to the chamber in said different portions of the chamber whereby the circulation of the fluid is different in said different portions of the chamber and corresponding zones of the material are subjected to different current action in said different portions of the chamber.

13. In an apparatus for treating materials with gaseous fluids, the combination with a chamber, and means for causing material to be treated to pass through successive portions of said chamber, of fluid propelling means, and discharge nozzles through which the fluid is discharged by said propelling means at relatively high velocity into each of said different portions of the chamber, the discharge nozzles in different portions of the chamber being arranged to direct the discharging fluid through spaces along different sides of the material whereby the circulation of the fluid is different in said different portions of the chamber and corresponding zones of the material are subjected to different current action in said different portions of the chamber.

ALFRED E. STACEY, Jr.